US005410253A

United States Patent [19]

Evans et al.

[11] Patent Number: 5,410,253

[45] Date of Patent: Apr. 25, 1995

[54] METHOD OF INDICATING COMBUSTION IN AN INTERNAL COMBUSTION ENGINE

[75] Inventors: Rodger B. Evans, Rochester Hills; Robert W. Mince, Oak Park; Carlton T. Davis, Howell, all of Mich.; Daniel H. Hopper, Peru, Ind.; Joel F. Downey, Kokomo, Ind.; Mark A. Laubenstein, Windfall, Ind.

[73] Assignee: Delco Electronics Corporation, Kokomo, Ind.

[21] Appl. No.: 43,703

[22] Filed: Apr. 8, 1993

[51] Int. Cl.[6] ..................... F02P 17/00; G01M 15/00; G01P 3/48

[52] U.S. Cl. .................................... 324/391; 324/170; 73/116

[58] Field of Search ............... 324/391, 392, 169, 170, 324/378–380; 123/414–416; 73/116, 117.3

[56] References Cited

U.S. PATENT DOCUMENTS

| | | | |
|---|---|---|---|
| 4,463,728 | 8/1984 | Bogden | 123/415 |
| 4,483,183 | 11/1984 | Suzuki et al. | 73/116 |
| 5,157,965 | 10/1992 | Koegeler et al. | 73/116 |

*Primary Examiner*—Kenneth A. Wieder
*Assistant Examiner*—Jay M. Patidar
*Attorney, Agent, or Firm*—Michael J. Bridges; Mark A. Navarre

[57] ABSTRACT

Absolute engine position sensing is provided by monitoring the temporal relationship of energization of multiple spark plugs sharing a common source of drive energy in a direct ignition application. The spark plugs are connected across the source with opposing electrical polarity, and the relative time of discharge across the plugs compared by sensing the time and polarity of high speed transient activity in proximity to the source.

7 Claims, 3 Drawing Sheets

METHOD OF INDICATING COMBUSTION IN AN INTERNAL COMBUSTION ENGINE

BACKGROUND OF THE INVENTION

The application of camshaft position sensors in internal combustion engine control is known generally in the art of engine control. For instance, such sensors may provide engine absolute position information which may be used to synchronize relative position inputs to the control, such as from a crankshaft position sensor. The camshaft position sensor is typically a dedicated sensor, such as a conventional variable reluctance sensor disposed in proximity to the camshaft to sense passage of an appendage placed on the camshaft, and to communicate the passage to a controller for use in synchronizing a relative engine position input. Significant expense is associated with this approach to sensing camshaft position including the cost of the variable reluctance sensor and the associated packaging and wiring, and the additional machining on the camshaft.

In a direct ignition system (DIS) for spark plug ignition in an internal combustion engine, pairs of spark plugs are coupled to a single supply. The supply may be a conventional step-up transformer, the timing of the charge and discharge of which are controlled by a spark controller. The pair of spark plugs may be coupled in series across the secondary winding of the transformer in reverse electrical polarity, wherein the anodes of the pair are grounded. The transformer provides energizing voltage to the pair of spark plugs whenever either of the two must be fired for desired engine control. DIS provides a cost advantage over electronic ignition systems having one dedicated coil per spark plug.

Accordingly, it would be beneficial to supplant the camshaft position sensor with a low cost alternative thereto that is suitable for application with DIS.

SUMMARY OF THE INVENTION

The present invention provides the desired benefit by providing absolute engine angular position information without a camshaft position sensor in a direct ignition application. The present invention detects engine absolute position by monitoring ignition signals in an ignition system for an internal combustion engine, especially a direct ignition system.

More specifically, the present invention monitors high speed transient voltage activity across the cathode to anode gap of a pair of plugs sharing a drive transformer in a direct ignition system. The time of occurrence of discharge across the gap of a predetermined one of the two plugs is compared to the time of occurrence of discharge across the gap of the other. A single transient pickup is used, supplying a single signal to an analyzing means, wherein the pair of plugs are distinguished by the electrical polarity of the transients received. A compression event in a predetermined one of the two cylinders is detected when the discharge across the gap of the corresponding spark plug occurs after the discharge of the other of the pair of spark plugs. Such event provides absolute engine position information, just as would a camshaft position sensor, and thus may be used to synchronize the engine control, replacing such prior sensor hardware as the camshaft position sensing hardware.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
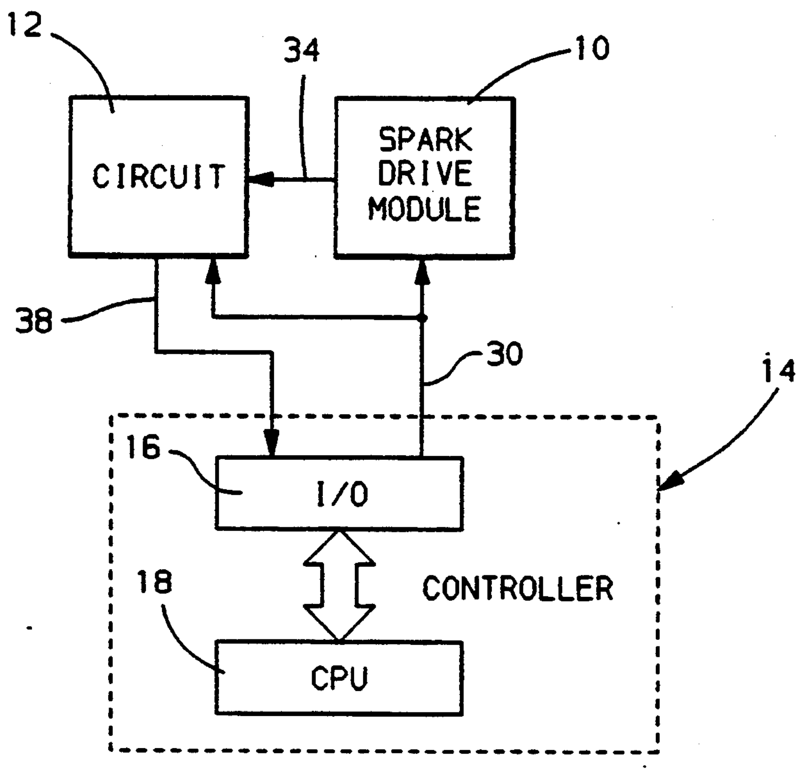
FIG. 1 is a block diagram showing a general hardware layout in accord with this invention.

Referring to FIG. 1, a controller 14, which may be a conventional single chip microcontroller having input/output means I/O 16 and central processing unit CPU 18, electrically communicates a spark command to spark drive module 10 and to circuit 12 via line 30. The spark drive module 10 is a direct ignition module, wherein two spark plugs are driven by the module, as will be detailed in the description of the circuit of FIG. 2.

The spark drive module provides an output signal to circuit 12 via line 34. The output signal includes a periodic positive going transient voltage and a periodic negative going transient, which are interpreted by the circuit 12 to form an output signal on line 38 from circuit 12 back to controller 14 indicating the occurrence of cylinder events, such as the occurrence of an event in a predetermined cylinder. Circuit 12 is detailed in FIG. 4, to be described. The signal on line 38 may be used by controller 14 in a determination of absolute engine position by relating the detected event to an absolute engine angle in an engine operating cycle. In a manner generally understood in the art of engine control and diagnostics, the absolute position determination may be used to synchronize relative engine position signals, such as signals from an engine crankshaft position sensor (not shown).

Figure 2:
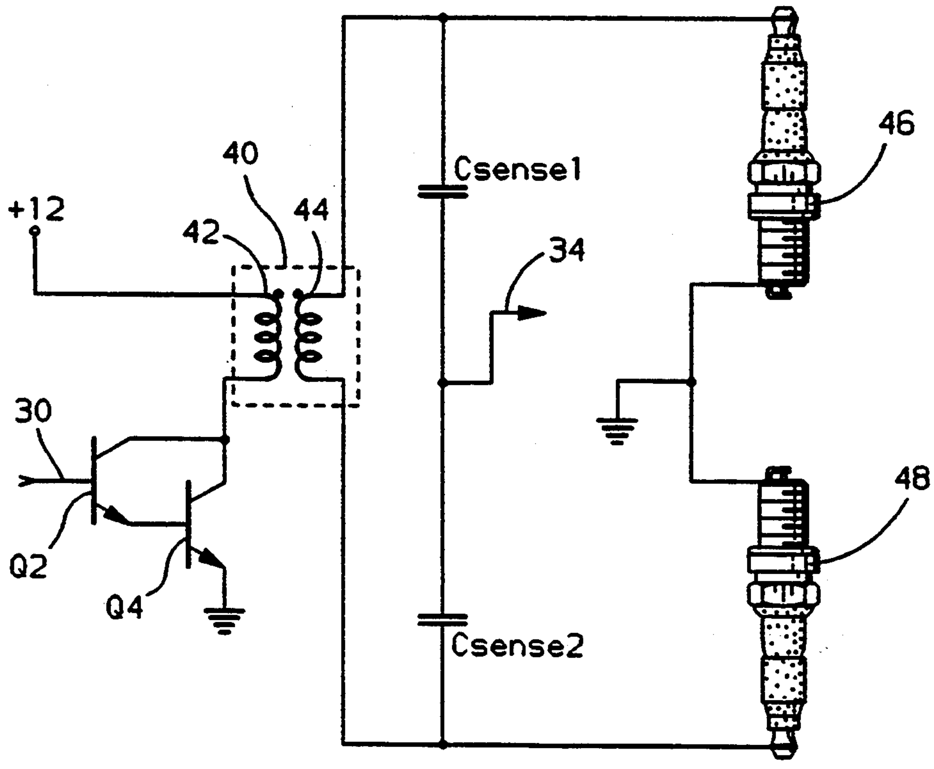
FIG. 2 illustrates a spark drive circuit including spark detection circuitry in accord with an embodiment of this invention.

The spark drive module 10 is detailed in FIG. 2, wherein a conventional step-up transformer 40, including primary coil 42 and secondary coil 44 is driven by a Darlington transistor pair including transistors Q2 and Q4, controlled by a spark command on line 30, connected to the base of Q2. The high side of the primary coil 42 is connected to a supply voltage, set at approximately twelve volts from a twelve volt battery (not shown) in this embodiment, such that when spark command on line 30 is high, as illustrated by the signal 60 in FIG. 3, Darlington pair Q2 and Q4 will be conducting from the low side of primary coil 42, and the current through primary coil 42 will be charging up.

When spark command on line 30 drops low, the collapsing magnetic field caused by the interrupted current in the primary 42 drives up the voltage across the secondary coil 44. Secondary capacitance in the circuitry connected to secondary coil 44 slows the rise in voltage across the secondary, as is generally understood in the art of ignition control. The voltage will continue to rise until reaching the breakdown voltage across the cathode to anode gap of spark plugs 46 and 48. Current will discharge across the gap of the spark plugs 46 or 48 when their respective breakdown voltage is reached, as is generally understood in the art.

Spark plug 46 is disposed in a first cylinder, such as cylinder number one, and spark plug 48 is disposed in a second cylinder, such as cylinder number four of an internal combustion engine (not shown). The discharge from coil 44 across the cathode to anode gap of spark plug 48 will be of negative voltage polarity as illustrated by the signal 62 of FIG. 3, and the discharge across the cathode to anode gap of spark plug 46 will be of positives voltage polarity, as illustrated in signal 64 of FIG. 3.

Figure 3:
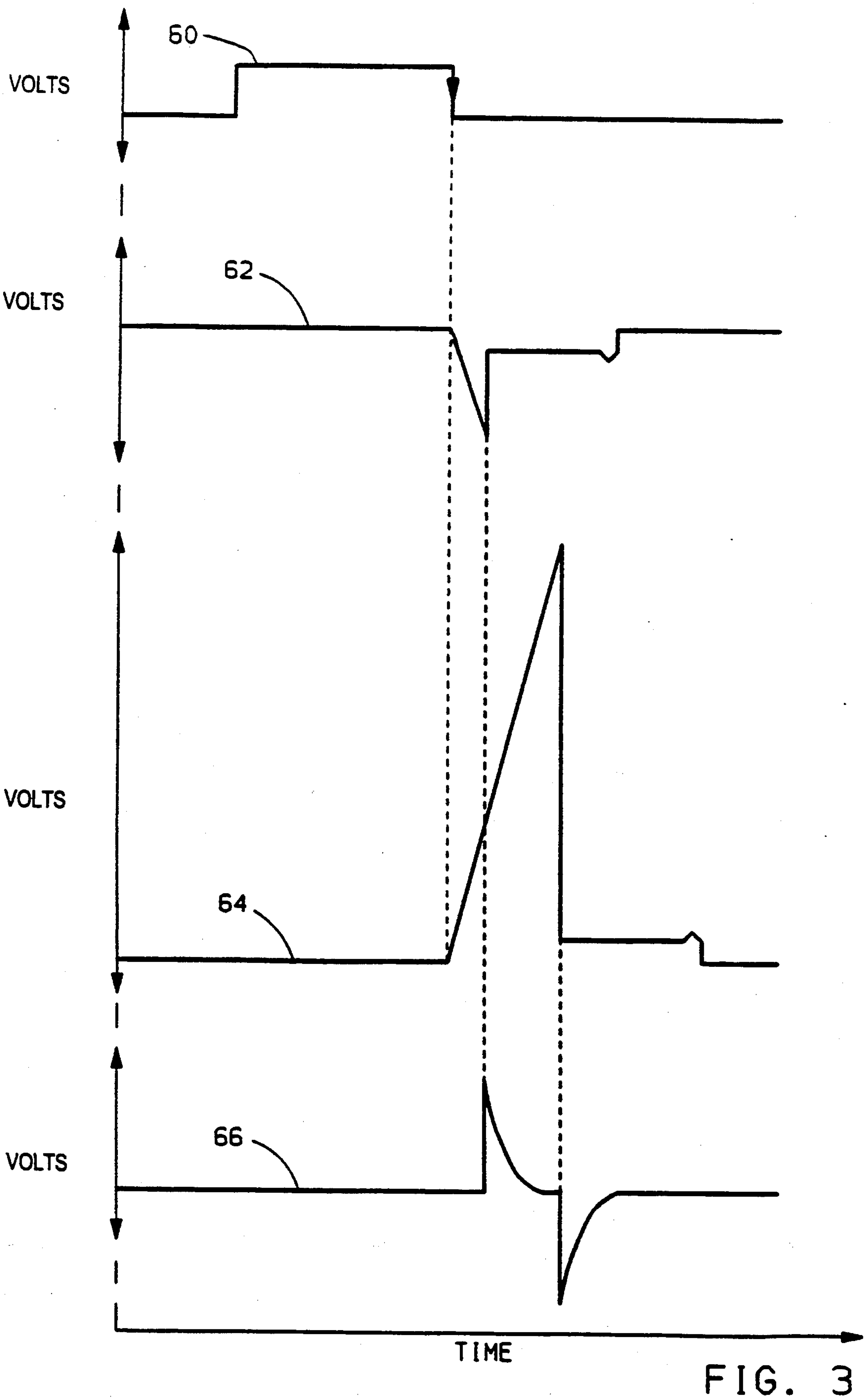
FIG. 3 is a timing diagram illustrating a time relationship of signals representative of those generated by the circuit of FIG. 2.

In accord with conventional ignition systems wherein a single spark command drives multiple spark plugs, such as in direct ignition systems, the signal, such as signal 60 in FIG. 3, will be issued to the circuit of FIG. 2 when either spark plug 46 or 48 is to be fired. In a direct ignition system, such as that of this embodiment, when one of the plugs 46 or 48 is to be fired, one of the corresponding cylinders will be in its compression stroke at high pressure and the other will be in a lower pressure stroke, such as the exhaust stroke with its exhaust valves open.

It is generally understood by those skilled in the art of ignition control that a relationship of direct proportionality exists between cylinder pressure magnitude and the magnitude of the breakdown voltage across a given spark plug gap. For example, in a direct ignition system, the spark plug in a cylinder undergoing a compression event requires a significantly higher voltage across its gap for breakdown than does its counterpart spark plug in a cylinder undergoing a lower pressure exhaust event.

As the two plugs share a common source of ignition energy in a direct ignition system, namely the secondary coil 44 (FIG. 2), the spark plug in the high pressure cylinder will require more time to reach its breakdown voltage than will the plug in the lower pressure cylinder. A factor in the magnitude of this time difference is the amount of capacitance in the drive circuitry including the secondary coil 44 and the spark plugs, as this capacitance reduces the rate at which voltage from the secondary charges up across each of the spark plugs 46 and 48, as described.

Experimentation has demonstrated that this time difference between breakdown of the pair of plugs is measurable. Accordingly, analysis of the time relationship of the discharge ignition voltage across pairs of spark plugs in such systems provides direct information on which plug and thus which cylinder is in its compression or alternatively its exhaust stroke. The absolute angular position of the engine may be derived therefrom by relating the detected cylinder event to absolute engine position.

Furthermore, as the voltage across pairs of spark plugs driven by a common ignition source in a direct ignition system are of known opposite polarity, the analysis of the time relationship may be simplified by analyzing the time relationship between positive and negative ignition signals in a single circuit. For example, signals 62 and 64 in FIG. 3 illustrate transient voltages across the gaps of two plugs having a single drive coil in a direct ignition system. Signal 62 illustrates the voltage across the gap of a plug with an electrical connection of negative polarity, such as plug 48 in FIG. 2, and signal 64 illustrates the voltage across the gap of a plug with an electrical connection of positive polarity, such as plug 46 in FIG. 2.

While the voltage across the two gaps starts to increase in magnitude substantially contemporaneously as is seen with signals 62 and 64 of FIG. 3, the plug of negative electrical polarity reaches its relatively low breakdown voltage more quickly, as it is in a relatively low pressure exhaust stroke, and the plug of positive polarity requires significantly more time to reach its high breakdown voltage as it is in the relatively high pressure compression or power stroke in its cycle. Signal 66 of FIG. 3 illustrates a coupled signal containing information on the temporal relationship between the signals 62 and 64, for example as may be used in a determination of engine absolute position.

This determination is provided in accord with this invention by sensing ignition events in a spark plug pair driven by a common direct ignition coil, by communicating the sensed events to a circuit or processing means for identifying sensed events to a particular cylinder, and by providing such identification as engine control information with which absolute engine angular position may be determined.

Specifically, to sense ignition events in accord with this embodiment of the invention, sense capacitors Csense1 and Csense2 (FIG. 2) are formed by placing a respective first and second surface of conventional conductive material in close proximity to the secondary coil 44 of the transformer 40 which drives the two spark plugs of interest. Conductive leads should be provided from each of the surfaces to a common node, which is provided to the signal analysis circuit of FIG. 4, via line 34.

Ignition voltage transients of sufficiently high speed will be reflected across the capacitors Csense1 and Csense2 formed between the first and second surfaces and the high and low sides of the secondary coil 44. The plate size and location relative to the secondary coil determine the capacitance of the formed capacitor, and should be selected to pass the high speed voltage transition across each spark plug gap when the gap breaks down. Line 34 includes a resistive path to ground, to be described. As such, a high pass filter is formed by the capacitance of Csense1 and Csense2 and resistive path, wherein only the high speed transients across the spark plug gaps are passed to line 34. For instance, the high speed transient from the negative voltage peak toward zero volts (signal 62 of FIG. 3) is passed across Csense2 to line 34 in the form of a rapid voltage change in the positive direction. Conversely, the high speed transient from the positive peak toward zero volts (signal 64 of FIG. 3) is passed across Csense2 to line 34 in the form of a rapid voltage change in the negative direction.

The coupled signal 66 of FIG. 3 illustrates the signal provided to line 34 in the case in which spark plug 48 having negative polarity fires during an exhaust stroke, referred to herein as a waste spark, and spark plug 46 having positive polarity fires during a compression stroke, referred to herein as a non-waste spark.

In this embodiment, the absolute engine position at the time a non-waste spark is provided to cylinder four of the engine (not shown), which is equivalent to the time a waste spark is provided to cylinder one of the engine, is to be detected and communicated to the engine controller 14 (FIG. 1) for synchronization of relative engine events, such as crankshaft events. The spark plug in cylinder one is driven by an ignition signal of positive electrical polarity, such the plug 46 in FIG. 2. The spark plug in cylinder number four, such as plug 48 in FIG. 2, is driven by the same direct ignition circuit, such as that of FIG. 2, but has negative ignition signal polarity.

Figure 4:
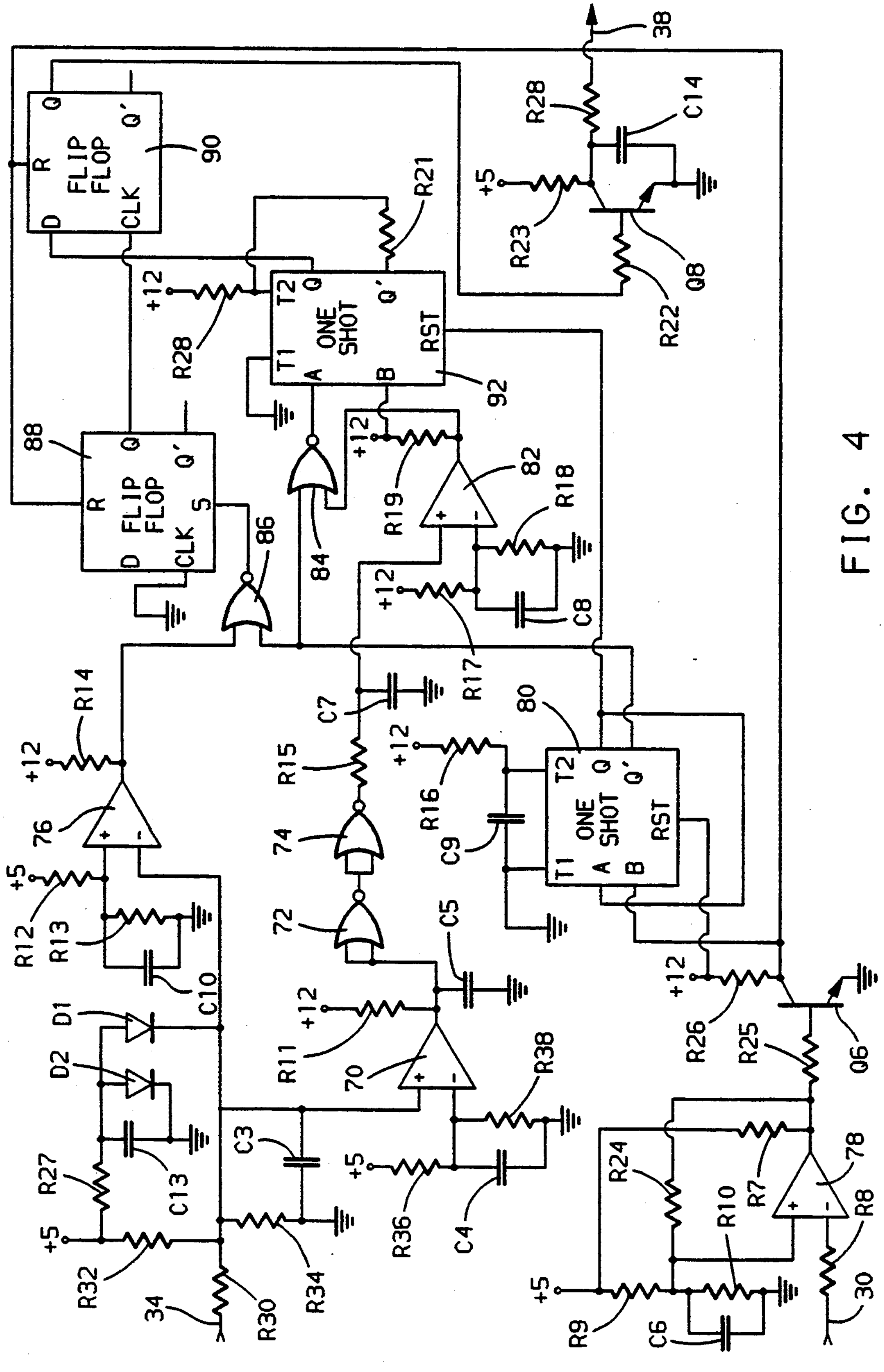
FIG. 4 is a circuit used to interpret a spark detect&on signal generated by the circuit of FIG. 2.

In general then, the circuit of FIG. 4 diagnoses the non-waste spark in cylinder four by determining when the ignition signal sensed on line 34 of FIG. 4 of negative polarity occurs before the ignition signal on line 34 of positive polarity. When a non-waste spark is detected in cylinder four, the circuit of FIG. 4 outputs a falling edge signal on line 38. The falling edge is received by controller 14, such as by a conventional input capture port in input/output I/O unit 16, and the time of the falling edge is stored for conventional engine synchronization purposes, for example in a manner analogous to the synchronization using a conventional signal from a camshaft position sensor (not shown).

The specific interconnection of the elements that make up the circuit 12 (FIG. 1) in accord with this embodiment are illustrated in FIG. 4. The signal from line 34 is passed through resistor R30, set at five kilo-ohms to bias adjusting circuitry including resistors R32 and R34, both set at twenty kilo-ohms. R32 is tied to a five volt supply, and R34 is tied to ground. These resistors increase the bias point of the coupled ignition signal to approximately 2.5 volts, so that both sensed ignition signals will be above zero volts and yet will be distinguishable.

A clamping circuit including twenty kilo-ohm resistor R27, 0.1 micro-Farad capacitor C13, and diodes D1 and D2 is connected to the bias adjusted signal, to clamp negative transients. It is generally understood in electronics that certain common circuit elements, such as several conventional comparators, do not function in a predictable manner when negative voltage inputs are applied to them. Accordingly, it is customary to clamp inputs that may potentially take on negative values before passing such inputs on to the sensitive circuit elements. The inventors intend that a conventional negative voltage clamp may be applied to the bias adjusted signal for this purpose.

Filtering capacitor C3 set at 20 pico-Farads is connected between the bias adjusted signal and ground to decrease the slope of the signal edges by passing high frequency transients to ground, thereby widening the pulse duration. The input signal on line 34, having been bias adjusted, clamped and filtered, is passed to two comparators 70 and 76. Specifically, it is passed to the non-inverting input of comparator 70, and to the inverting input of comparator 76.

The inverting input of comparator 70 is fixed at approximately one volt by dividing down a five volt voltage supply signal via voltage divider formed by 40 kilo-ohm resistor R36, 10 kilo-ohm resistor R38, and 0.1 micro-Farad filtering capacitor C4. The non-inverting input of comparator 76 is set at approximately 4.0 volts by dividing down a five volt supply signal via voltage divider formed by 10 kilo-ohm resistor R12, 40 kilo-ohm resistor R13, and 0.1 micro-Farad filtering capacitor C10.

Accordingly, the output of comparator 70 will be biased high, and will remain high until a low voltage ignition transient from a discharge across the gap of spark plug 46 (FIG. 2) is provided on line 34, driving the non-inverting input of comparator 70 to substantially less than one volt. The comparator 70 output will remain low until the spark plug transient has passed, approximately 0.5 microseconds in this embodiment, and then will return high.

The high output from comparator 70 is passed through pulse extending circuitry including 100 kilo-ohm resistor R11 and 220 pico-Farad capacitor C5, wherein when output of comparator 70 switches high, the signal out of the pulse stretching circuitry will, rise at an exponential rate as C5 charges up to the high level. This delayed rising edge is passed successively to NOR gates 72 and 74, connected in series as signal level inverters.

The output of the NOR gates 72 and 74 is a squared version of the pulse stretching circuitry output having a rising edge delayed by the amount of time required for the exponential voltage rise from the pulse stretching circuitry to cross the threshold of the NOR gate 72. In this embodiment, the rising edge of the signal is delayed through the NOR gates by approximately fifteen microseconds from the time of the rising edge of comparator 70. Of course, the falling edge of the signal out of comparator 70 is not delayed by the pulse stretching circuitry or by the NOR gates.

Output of NOR gate 74 is passed through first order filter including ten kilo-ohm resistor R15 and 100 pico-Farad capacitor C7, having a time constant equal to R15 * C7, approximately one microsecond, to delay the edges of the NOR gate 74 output. The filter output is passed to the non-inverting input of comparator 82. The inverting input of comparator 82 is connected to a predetermined threshold voltage of approximately 4.4 volts, or the supply voltage from battery (not shown) of approximately twelve volts divided by the constant e, which is generally known to be about 2.7. This voltage setting is provided via a conventional voltage divider including 12.7 kilo-ohm resistor R17, 7.3 kilo-ohm resistor R18, and a voltage supply signal of approximately twelve volts.

Transitions at the output of NOR gate 74 will thus be delayed by one time constant of the filter formed by R15 and C7 before appearing at the output of comparator 82. Sensitivity of this delay to variations in supply voltage is decreased by dividing down the supply voltage via this divider circuit at the inverting input to comparator 82. Conventional filtering on the signal through the divider circuitry is provided by 0.1 micro-farad capacitor C8. Comparator 82 output is high when the output of NOR gate 74, delayed by the first order filter exceeds approximately 4.4 volts, and comparator output is low otherwise.

In this embodiment, comparator 82 output is thus a delayed version of the detected negative going ignition transient on line 34, with a delay of approximately 1.5 microseconds, one microsecond of which is provided by the first order filter including R15 and C7, and the other 0.5 microseconds of which is due to circuit propagation delays. Comparator 82 output is pulled up through resistor R19, set at ten kilo-ohms, and passed as an input to two-input NOR gate 84.

Returning to comparator 76, this comparator output is low when a positive ignition voltage transient is detected that exceeds its four volt non-inverting input. Such a transient is detected in this embodiment when Csense2 of FIG. 2 passes a positive going ignition transient, as described. Otherwise, comparator 76 output is high. Comparator 76 output is pulled up via ten kilo-ohm resistor R14 and is passed as an input to two-input NOR gate 86.

The second input to both NOR gates 84 and 86 is an output Q' from conventional one-shot 80. Generally, this one-shot fires for approximately 100 microseconds after the falling edge of the spark command, such as the falling edge of the signal 60 in FIG. 3, which starts the charge-up of the voltage across the gap of spark plugs 46 and 48 of this embodiment, as described. The one-shot firing thus provides approximately a 100 microsecond window in which to analyze the ignition transient, as will be described.

Specifically, the spark command on line 30 is input to the inverting input of comparator 78 through resistor R8, set at 51 kilo-ohms. R8 is provided to limit loading on the spark command line. A voltage level is provided to the non-inverting input of comparator 78 via a voltage divider including twenty kilo-ohm resistor R9 and ten kilo-ohm resistor R10. Comparator input filtering is provided by 0.001 micro-Farad capacitor C6. The voltage level at the non-inverting input to comparator 78 should be set to the spark command threshold level, below the voltage level on line 30 during ignition dwell periods and above the voltage level on line 30 during non-dwell periods.

Conventional comparator threshold hysteresis is provided in this embodiment by connecting resistor R24 of 25 kilo-ohms between the comparator output and its non-inverting input. As such, the comparator 78 output will be low when the spark command input from line 30 exceeds approximately 2.3 volts, but will not be driven high unless the input from line 30 drops below approximately 1.3 volts, which generally decreases the sensitivity of comparator 78 to input noise.

The output of comparator 78 is high when the spark command is low, and the output is low during the ignition dwell period, when the spark command is high. The comparator output is pulled up via 4.7 kilo-ohm resistor R7, and is passed through 47 kilo-ohm resistor R25 to inverting transistor Q6. The output of the inverter Q6 is pulled up to supply voltage of twelve volts via ten kilo-ohm resistor R26, and is passed to the reset input R of conventional D flip-flop 90, to be described, to the reset input R of conventional D flip flop 88, to be described, and to input B of one-shot 80.

The conventional one-shot 80 provides a window around the ignition events of interest, during which time analysis and temporal comparison of the positive and negative ignition transients from the pair of spark plugs 46 and 48 may be made. Specifically, when the spark command line 30 drives the active low input B to the one-shot 80 low, which is at the end of the dwell period when the voltage across the gap of the two spark plugs 46 and 48 (FIG. 2) starts to charge up to the respective breakdown voltages, the one-shot output Q is driven high, and the inverted one-shot output Q′ goes low.

Q′ is provided to NOR gates 84 and 86, gating the other input to the NOR gates through to the respective NOR gate outputs. This gating through of the NOR gate inputs continues for the period of the one-shot 80, set at approximately 100 microseconds in this embodiment by connecting 0.01 micro-Farad capacitor C9 and ten kilo-ohm resistor R16 to the one-shot as illustrated in FIG. 4, in accord with generally known applications of one-shot circuit elements.

During this active period of one-shot 80, the output of comparator 76 is gated through as a set input S to D flip flop 88. The output Q of flip flop 88 is provided as a clock input CLK to D flip flop 90, wherein CLK is active on a rising edge. Accordingly, in a critical part of this embodiment of the invention, during the period of one-shot 80, the state of the input D to flip flop 90 will be gated through to its output Q when the output of comparator 76 switches from high to low, which is at the approximate time a positive ignition transient is detected at input line 34.

During this active period of one-shot 80, the output of comparator 82 is gated through as input A to one-shot 92. The other input B to one-shot 92 is active low, and is disabled by connecting it to a positive voltage source, such as a twelve volt source. The output Q of one-shot 92 is connected as the data input D to flip flop 90. One-shot 92 is connected in a configuration wherein it functions as a conventional set-reset flip flop, where the active high set input is A, the active low set input is B which is disabled in this embodiment, the reset input is the one-shot reset input RST, timer input T1 is grounded, timer input T2 is pulled up through resistor D28, set at 200 kilo-ohms, and the inverted output Q′ is tied to T2 through resistor R21 set at 10 kilo-ohms.

Functionally, output Q of one-shot 92 will be driven high when the output of comparator 82 is driven low during the 100 microsecond window period of one-shot 80. The output Q of one-shot 92 will return low at the end of the window period, when the output Q of one-shot 80 drops low, activating the active low one-shot reset RST input. The output of NOR gates 86 and 88 will also drop low at the end of the window period, blocking propagation of signals from line 34 through to the output of the NOR gates.

Therefore, the data input D to flip flop 90 will remain low until approximately 1.5 microseconds after a negative ignition transient is detected on line 34, indicating ignition at the cylinder one spark plug. The output Q of flip flop 90 will thus be high if the negative transient on line 34, indicating ignition in cylinder one, occurs over 1.5 microseconds before the positive ignition transient indicating cylinder four ignition. Such a temporal relationship between the negative and positive transients on line 34 would indicate in accord with this invention that cylinder one is in its exhaust stroke and cylinder four is in its compression stroke, as described. Alternatively, the output of flip flop 90 will be low if ignition in cylinder one occurs within 1.5 microseconds of ignition in cylinder four, or after ignition in cylinder four. The output Q of flip flop 90 will be reset to zero at the start of the next dwell period, as its reset pin R will be activated by the high output of inverting transistor Q6. The high output of Q6 will also reset flip flop 88 via its reset input R.

A high output Q of flip flop 90 will be used for synchronization in controller 14 (FIG. 1), and a low output will be ignored by the controller. The time offset between the transients provided by the circuit of FIG. 4, wherein the negative transient from cylinder one is delayed by approximately 1.5 microseconds before being compared to the time of the transient from cylinder four, compensates for expected time variations between the detected ignition events in the two cylinders under analysis, such as cylinders one and four in this embodiment. The time relationship between the two events may not, unless compensated, be easily distinguished, for example, when the events occur substantially at the same time, or when the waste spark event occurs after the non-waste event.

The inventors have determined that, in some applications of this invention, there are engine operating ranges wherein the waste spark event may occur a very short period of time after the non-waste event. The relative pressure in the two cylinders under analysis at the time of ignition, the secondary capacitance of the circuit of FIG. 2, and the engine operating point at the time of ignition all affect this time relationship between spark events. Analysis of the time relationship between the two ignition events for the specific application should be made to determine the extent of such timing variations. The delay imposed between the two signals before they are compared should then be set slightly larger in magnitude than the expected amount of time by which the waste spark signal could occur after the non-waste signal, such as the 1.5 microseconds of the present embodiment.

By setting an appropriate delay as described, the circuit of FIG. 4 will only generate synchronization information when ignition in the compressing cylinder clearly lags ignition in the exhausting cylinder. Such information reliably indicates engine absolute position despite the expected minor variations in the temporal relationship between the transients. In other embodiments of this invention, the delay may be adjusted, or eliminated entirely.

Returning to flip flop 90, the output Q is provided to the base of inverting transistor Q8 through ten kilo-ohm resistor R22. The collector of Q8 is pulled up to five volts through one kilo-ohm resistor R23, and the emitter is tied to ground. The output of the inverting transistor Q8 is filtered via capacitor C14 set at 0.001 microFarads, and buffered via 500 ohm resistor R28 to output line 38, which is connected to controller 14 (FIG. 1), as described. The time of the occurrence of a falling edge on line 38 is interpreted by controller 14 as the time of a compression stroke in a predetermined cylinder, such as cylinder four in this embodiment, or equivalently, as the time of the exhaust stroke in a predetermined cylinder, such as cylinder one in this embodiment.

The preferred embodiment for the purpose of explaining this invention is not to be taken as limiting or restricting the invention since many modifications may be made through the exercise of skill in the art without departing from the scope of the invention.

The embodiments of the invention in which a property or privilege is claimed are described as follows:

1. A method for indicating an occurrence of a combustion event in a specified cylinder of a multi-cylinder internal combustion engine for use in determining absolute engine position, said engine having first spark means located at said specified cylinder and second spark means located at another cylinder, comprising the steps of:

applying an increasing ignition voltage across spaced electrodes of the first and second spark means;

sensing a first spark event when the increasing ignition voltage induces current across the spaced electrodes of the first spark means;

sensing a second spark event when the increasing ignition voltage induces current across the spaced electrodes of the second spark means; and indicating the occurrence of a combustion event in said specified cylinder when the sensed first spark event occurs at least a predetermined amount of time after the sensed second spark event, and determining the absolute engine position from the temporal relationship of said first and second spark events.

2. The method of claim 1, wherein the step of applying an increasing ignition voltage includes the step of applying a voltage of a first predetermined electrical polarity across the spaced electrodes of the first spark means and of a second predetermined electrical polarity opposing the first predetermined electrical polarity across the spaced electrodes of the second spark means.

3. The method of claim 1, wherein the step of sensing a first spark event includes detecting a first rate of change in voltage across the spaced electrodes of the first spark means, and comparing the detected first rate to a first predetermined threshold, and wherein the step of sensing a second spark event includes detecting a second rate of change in voltage across the spaced electrodes of the second spark means, and comparing the detected second rate to a second predetermined threshold.

4. A method for indicating an occurrence of a combustion event in a specified cylinder of a multi-cylinder internal combustion engine for use in determining absolute engine position, said engine having first spark means located at said specified cylinder and second spark means located at another cylinder, comprising the steps of:

applying an ignition voltage of increasing magnitude at a predetermined first electrical polarity across spaced electrodes of the first spark means and at a predetermined second electrical polarity opposing the predetermined first electrical polarity across spaced electrodes of the second spark means;

sensing when current is induced across the spaced electrodes of the first and second spark means from application of the ignition voltage;

sensing the electrical polarity of the induced current; and indicating the occurrence of a combustion event in said specified cylinder when induced current of the first electrical polarity occurs at least a predetermined amount of time before induced current of the second electrical polarity, and determining the absolute engine position from the temporal relationship of said induced currents.

5. The method of claim 4, wherein the step of sensing when current is induced includes the steps of sensing when the rate of change in voltage across the spaced electrodes of the first and second spark means exceeds a predetermined threshold.

6. A method for diagnosing a combustion event in a specified cylinder of a multi-cylinder internal combustion engine for use in determining absolute engine position, said engine having first spark means located at said specified engine cylinder and a plurality of other spark means located at other engine cylinders, comprising the steps of:

applying an increasing ignition voltage across spaced electrodes of each of the plurality of spark means;

sensing, for each of the plurality of spark means, when the increasing ignition voltage induces current across their respective spaced electrodes;

determining when current is induced across the spaced electrodes of said first spark means at least a predetermined amount of time after current is induced across the spaced electrodes of said other spark means; and diagnosing a combustion event in said specified cylinder when it is determined that current is induced across the spaced electrodes of said first spark means at least a predetermined amount of time after current is induced across the spaced electrodes of said other spark means, and determining the absolute engine position from the temporal relationship of the current induced in said spark means.

7. A method for indicating an occurrence of a combustion event in a specified cylinder of a multi-cylinder internal combustion engine for use in determining absolute engine position, said engine having one spark means located at said specified engine cylinder and a plurality of other spark means located at other engine cylinders, comprising the steps of:

applying an increasing ignition voltage across spaced electrodes of the one spark means and each of the plurality of other spark means;

sensing, for the one spark means and each of the plurality of other spark means, an occurrence of induced current from application of the increasing ignition voltage;

identifying a last spark means as the spark means having the last sensed occurrence of induced current from application of the increasing ignition voltage; and indicating an occurrence of a combustion event in said specified cylinder when the last spark means is the one spark means, and determining the absolute engine position from the temporal relationship of the current induced in said spark means.

* * * * *